(12) United States Patent
Ramakrishna et al.

(10) Patent No.: US 8,225,196 B2
(45) Date of Patent: *Jul. 17, 2012

(54) DYNAMIC WEB PAGE BEHAVIOR

(75) Inventors: Anand Ramakrishna, Redmond, WA (US); Christian Fortini, Redmond, WA (US); Alexander J. Zotov, Bellevue, WA (US); Roderick Chavez, Kirkland, WA (US); David H. Massy, Redmond, WA (US); Richard J. Gardner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/562,627

(22) Filed: Sep. 18, 2009

(65) Prior Publication Data

US 2010/0011284 A1 Jan. 14, 2010

Related U.S. Application Data

(63) Continuation of application No. 09/316,897, filed on May 20, 1999, now Pat. No. 7,594,166.

(51) Int. Cl.
*G06F 17/00* (2006.01)
*G06F 9/44* (2006.01)
*G06F 15/16* (2006.01)

(52) U.S. Cl. ........ 715/234; 715/205; 715/236; 715/760; 717/111; 717/115; 717/120; 709/203; 709/217

(58) Field of Classification Search .......... 715/200–207, 715/209, 210, 211, 222, 226, 227, 229, 230, 715/231, 232, 234, 242, 255, 256, 273, 760, 715/762, 763; 709/202, 203, 217, 218, 219; 717/100, 106, 107, 108, 110, 111, 114, 115, 717/120

See application file for complete search history.

(56) References Cited

U.S. PATENT DOCUMENTS

| | | | |
|---|---|---|---|
| 5,594,660 | A | 1/1997 | Sung et al. |
| 5,680,619 | A | 10/1997 | Gudmundson et al. |
| 5,761,684 | A | 6/1998 | Gibson |

(Continued)

FOREIGN PATENT DOCUMENTS

| | | |
|---|---|---|
| EP | 0818742 | 1/1998 |
| GB | 2329309 | 3/1999 |

OTHER PUBLICATIONS

Lie et al., "Cascading Style Sheets Level 1", W3C Recommendation, Dec. 17, 2006, revised Jan. 1999, pp. 1-69.
U.S. Appl. No. 09/316,897, Amendment and Response filed Feb. 7, 2003, 14 pgs.
U.S. Appl. No. 09/316,897, Amendment and Response filed Oct. 14, 2003, 14 pgs.

(Continued)

*Primary Examiner* — Maikhanh Nguyen
(74) *Attorney, Agent, or Firm* — Merchant & Gould P.C.

(57) ABSTRACT

In some embodiments, code can be encapsulated in an external behavior component for affecting the behavior of an element inserted into an HTML document. A reference can be attached to the element in the document to associate the element with the external behavior component. A renderer can parse the element in the HTML document and access the external component to modify a behavior of a page image. For example, the properties or location of a displayed element associated with the external behavior component may be changed on an event, the external behavior component can control user data input, or the external behavior component can draw on the page image. Multiple documents can reuse external behavior components, and an element can be associated with multiple external behavior components. The associations between elements and external behavior components may be maintained in cascading style sheets, inline with the elements, and in various formats.

9 Claims, 5 Drawing Sheets

U.S. PATENT DOCUMENTS

| | | | |
|---|---|---|---|
| 5,802,299 | A | 9/1998 | Logan et al. |
| 5,860,073 | A | 1/1999 | Ferrel et al. |
| 5,894,554 | A | 4/1999 | Lowery et al. |
| 5,905,492 | A | 5/1999 | Straub et al. |
| 5,907,704 | A | 5/1999 | Gudmundson et al. |
| 5,973,696 | A | 10/1999 | Agranat et al. |
| 6,006,242 | A | 12/1999 | Poole et al. |
| 6,026,433 | A | 2/2000 | D'Arlach et al. |
| 6,035,119 | A | 3/2000 | Massena et al. |
| 6,061,698 | A | 5/2000 | Chadha et al. |
| 6,085,220 | A | 7/2000 | Courts et al. |
| 6,101,510 | A | 8/2000 | Stone |
| 6,119,135 | A | 9/2000 | Helfman |
| 6,125,385 | A | 9/2000 | Wies et al. |
| 6,161,126 | A | 12/2000 | Wies et al. |
| 6,178,432 | B1 | 1/2001 | Cook et al. |
| 6,188,401 | B1 | 2/2001 | Peyer |
| 6,199,082 | B1* | 3/2001 | Ferrel et al. ............... 715/205 |
| 6,230,171 | B1 | 5/2001 | Pacifici et al. |
| 6,237,010 | B1 | 5/2001 | Hui et al. |
| 6,249,291 | B1 | 6/2001 | Popp et al. |
| 6,256,668 | B1 | 7/2001 | Slivka et al. |
| 6,263,352 | B1 | 7/2001 | Cohen |
| 6,266,681 | B1* | 7/2001 | Guthrie ..................... 715/234 |
| 6,278,448 | B1* | 8/2001 | Brown et al. ............... 715/866 |
| 6,279,006 | B1 | 8/2001 | Shigemi et al. |
| 6,286,043 | B1 | 9/2001 | Cuomo et al. |
| 6,347,398 | B1 | 2/2002 | Parthasarathy et al. |
| 6,353,850 | B1 | 3/2002 | Wies et al. |
| 6,397,217 | B1 | 5/2002 | Melbin |
| 6,397,245 | B1 | 5/2002 | Johnson et al. |
| 6,401,077 | B1 | 6/2002 | Godden et al. |
| 6,415,307 | B2 | 7/2002 | Jones et al. |
| 6,434,578 | B1 | 8/2002 | McCauley et al. |
| 6,470,349 | B1 | 10/2002 | Heninger et al. |
| 6,476,833 | B1* | 11/2002 | Moshfeghi ................. 715/854 |
| 6,504,554 | B1 | 1/2003 | Stone et al. |
| 6,546,397 | B1 | 4/2003 | Rempell |
| 6,585,777 | B1 | 7/2003 | Ramaley et al. |
| 6,651,108 | B2 | 11/2003 | Popp et al. |
| 6,668,354 | B1* | 12/2003 | Chen et al. ................ 715/255 |
| 6,751,778 | B1 | 6/2004 | Broman et al. |
| 6,799,320 | B1 | 9/2004 | Elvanoglu |
| 6,829,569 | B1 | 12/2004 | Drucker et al. |
| 6,886,013 | B1 | 4/2005 | Beranek |
| 7,117,446 | B2* | 10/2006 | Smith et al. ............... 715/762 |
| 7,594,166 | B1 | 9/2009 | Ramakrishna |
| 2003/0074634 | A1 | 4/2003 | Emmelmann |

OTHER PUBLICATIONS

U.S. Appl. No. 09/316,897, Amendment and Response filed Apr. 22, 2004, 22 pgs.

U.S. Appl. No. 09/316,897, Amendment and Response filed Dec. 13, 2004, 32 pgs.

U.S. Appl. No. 09/316,897, Amendment and Response filed Jun. 10, 2005, 30 pgs.

U.S. Appl. No. 09/316,897, Amendment and Response filed Dec. 21, 2005, 26 pgs.

U.S. Appl. No. 09/316,897, Amendment and Response filed Aug. 21, 2006, 16 pgs.

U.S. Appl. No. 09/316,897, Amendment and Response filed Dec. 22, 2006, 18 pgs.

U.S. Appl. No. 09/316,897, Amendment and Response filed Apr. 30, 2007, 15 pgs.

U.S. Appl. No. 09/316,897, Amendment and Response filed Oct. 17, 2007, 15 pgs.

U.S. Appl. No. 09/316,897, Amendment and Response filed Apr. 10, 2008, 13 pgs.

U.S. Appl. No. 09/316,897, Amendment and Response filed Jun. 10, 2008, 14 pgs.

U.S. Appl. No. 09/316,897, Amendment and Response filed Oct. 28, 2008, 14 pgs.

U.S. Appl. No. 09/316,897, Amendment and Response filed Apr. 9, 2009, 13 pgs.

U.S. Appl. No. 09/316,897, Amendment and Response filed Jul. 17, 2009, 14 pgs.

"Non Final Office Action", U.S. Appl. No. 09/316,897, (Jan. 22, 2009),37 pages.

"Notice of Allowance", U.S. Appl. No. 09/316,897, (Jun. 26, 2009),18 pages.

Lie, Hakon W., et al., "Multipurpose Web Publishing Using HTML, XML, and CSS" *Communication of the ACM*, vol. 41, No. 5, (May 1998),pp. 95-101.

Faraday, Pete et al., "Authoring Animated Web Pages Using Contact Points", CHI '99, (May 1999),pp. 458-645.

Gray, David N., et al., "Modern Languages and Microsoft's Component Object Model", *Communications of the ACM*, vol. 41, No. 5, (May 1998),pp. 55-65.

"Dynamic HTML: The Next Generation of User Interface Design Using HTML", Microsoft Corporation, (Feb. 1, 1997),pp. 1-7.

Stanek, W "Explore Creativity and Control With Dynamic HTML", *PC Magazine*, (Jan. 1998),pp. 1-7.

Burridge, Brett "Browser targeted Cascading Style Sheets using Javascripts" Retrieved from: <http://www.abiglime.com/webmaster/articles/jscript/012899.htm>on Oct. 21, 2009, The Complete Webmaster,(Jan. 28, 1999),3 pages.

Savio, N "What is Dynamic HTML?", (Oct. 1997),pp. 1-3.

Vitali, F et al., "Extending HTML in a principled way with displets", *Computer Networks and ISDN System*, (1997),pp. 1115-1128.

Pelegri-Llopart, E et al., "JavaServer Pages Specification" *Sun Java Software, A Division of Sun Microsystem, Inc.*, (Nov. 30, 1999),pp. 1-158.

Kindel, Charlie "COM: What makes it Work, Black-Box Encapsulation through Multiple, Immutable Interfaces", *IEEE*, (1997),pp. 68-77.

Wang, et al., "Customization of Distributed Systems Using COM" *IEEE Concurrency*, Jul.-Sep. 1998, vol. 6, (Jul. 1998),pp. 8-12.

Jones, et al., "Scripting COM components in Haskell" *IEEE, Software Reuse-Proceedings Fifth International Conference*, (Jun. 1998),pp. 1-9.

"Non-Final Office Action", U.S. Appl. No. 09/316,897, (Jul. 30, 2002),15 pages.

"Final Office Action", U.S. Appl. No. 09/316,897, (Apr. 18, 2003),17 pages.

"Non-Final Office Action", U.S. Appl. No. 09/316,897, (Dec. 19, 2003),11 pages.

"Non-Final Office Action", U.S. Appl. No. 09/316,897, (Aug. 12, 2004),14 pages.

"Final Office Action", U.S. Appl. No. 09/316,897, (Mar. 10, 2005),16 pages.

"Advisory Action", U.S. Appl. No. 09/316,897, (Jun. 20, 2005),2 pages.

"Non-Final Office Action", U.S. Appl. No. 09/316,897, (Sep. 22, 2005),15 pages.

"Non-Final Office Action", U.S. Appl. No. 09/316,897, (Mar. 21, 2006),14 pages.

"Final Office Action", U.S. Appl. No. 09/316,897, (Oct. 26, 2006),20 pages.

"Non-Final Office Action", U.S. Appl. No. 09/316,897, (Jan. 29, 2007),21 pages.

"Non-Final Office Action", U.S. Appl. No. 09/316,897, (Jul. 18, 2007),20 pages.

"Final Office Action", U.S. Appl. No. 09/316,897, (Jan. 11, 2008),19 pages.

"Advisory Action", U.S. Appl. No. 09/316,897, (May 19, 2008),3 pages.

"Non-Final Office Action", U.S. Appl. No. 09/316,897, (Jul. 29, 2008),21 pages.

Massy, Dave "Time Off for Good Behavior: DHTML Behaviors in Internet Explorer 5", (Mar. 1999),pp. 1-7.

Esposito, Dino "Scripting Evolves to a More Powerful Technology—HTML Behaviors in Depth", (Apr. 1999),pp. 1-11.

* cited by examiner

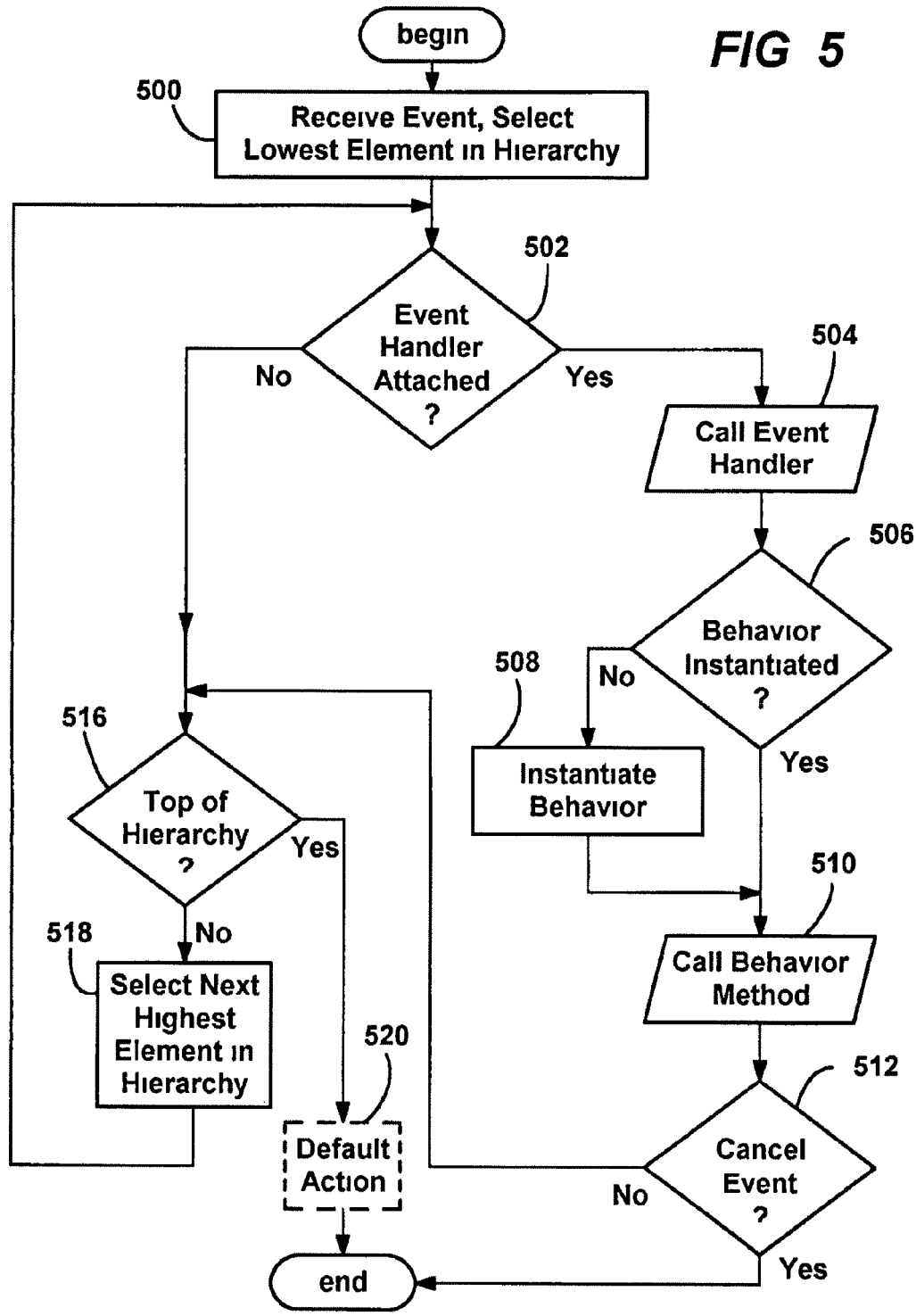

DYNAMIC WEB PAGE BEHAVIOR

RELATED APPLICATIONS

This application is a continuation of and claims priority to U.S. patent application Ser. No. 09/316,897 (issued as U.S. Pat. No. 7,594,166), entitled "Dynamic Web Page Behaviors," filed on May 20, 1999, the disclosure of which is incorporated herein by reference in its entirety.

BACKGROUND

Browsers display web pages by interpreting Hypertext Markup Language (HTML) which includes sets of tags nested within other sets of tags around content to render. To assist the authors and designers in creating such web pages, a recent development is the use of cascading style sheets, via which the author or designer may globally specify styles for selected page elements, including appearance information such as color and point sized of text, page margins, and leading (spacing between lines). A style sheet is essentially a template that controls the formatting of HTML tags on a page, and can be linked to a page or embedded in a page. Style sheets separate the formatting information from the actual content on HTML pages, whereby it has become easier for authors and designers to design and revise pages.

An improvement to how a web page may be made to appear to a viewer is Dynamic HTML (DHTML), which enhances the appearance of a page's elements by adding effects thereto.

Dynamic HTML (DHTML) also allows an HTML document to become interactive, which is accomplished by allowing HTML elements or tags within the HTML document to be programmable, such that script can change the content and attributes of the HTML page. For example, a script on the page may allow a list to be expanded or collapsed in response to a mouse click, without needing to retrieve a different HTML document from the server. The script resides on the same page as the other elements, even when the script is obtained from a separate file, since that script is particular to the page and is essentially imported into the page when the HTML document is loaded.

In essence, three job disciplines are involved in creating a DHTML page, i.e., a content provider, designer, and engineer. The content provider is the author of the content of the document, while the designer decides on the look and feel of the document, and typically adds any formatting information. The engineer adds the dynamic functionality using script. In many situations, these jobs are not performed by one highly-skilled person, but by three separate individuals of different skill levels, as many authors and designers are uncomfortable with programming. This, along with the fact that the script resides on the same page as the other elements, makes DHTML expensive and fragile to use in web documents. More particularly, as the engineer applies one or more scripts to every page, the process becomes expensive and error prone, as subsequent content changes by the author or designer may affect the script. At the same time, the engineer may affect the layout or content of the document when adding the script to the page. Even for those authors and designers who are comfortable with programming concepts and with using script to add dynamic functionality to a document, having the script and content in the same file makes the page creation and maintenance processes relatively slow and difficult to manage.

SUMMARY

One or more embodiments can add script-like behavior to an element via a component that is external to the page. An external behavior is created for affecting the behavior of elements inserted into an HTML document by encapsulating code in an external behavior component, such as a COM (component object model) object. A designer or the like adds simple tags to the document to associate the external behavior component with selected elements, thereby separating script from content. These associations between elements and external behavior components may be maintained in cascading style sheets, inline with the elements, and in various formats.

In some embodiments, when the document is provided to a renderer and the renderer parses the element in the document, the renderer can access the associated external component to modify a behavior of the page image. For example, the properties or location of a displayed element associated with the external behavior component may be changed on an event such as a mouseover event. An external behavior component can provide mask behavior to control the format and type of user data input. Another external behavior component can draw on the image when accessed by the renderer.

Multiple documents can reuse external behavior components, enabling, for example, an entire web site to share a common behavior. An element can be associated with multiple external behavior components to provide multiple effects, such as changing color and expanding a list when clicked by a user.

BRIEF DESCRIPTION OF THE DRAWINGS

FIG. 5 is a flow diagram generally representing steps taken when an event is received to render a page or apply a behavior to one or more elements of a rendered page in accordance with one or more embodiments.

DETAILED DESCRIPTION

Operating Environment

Figure 1:
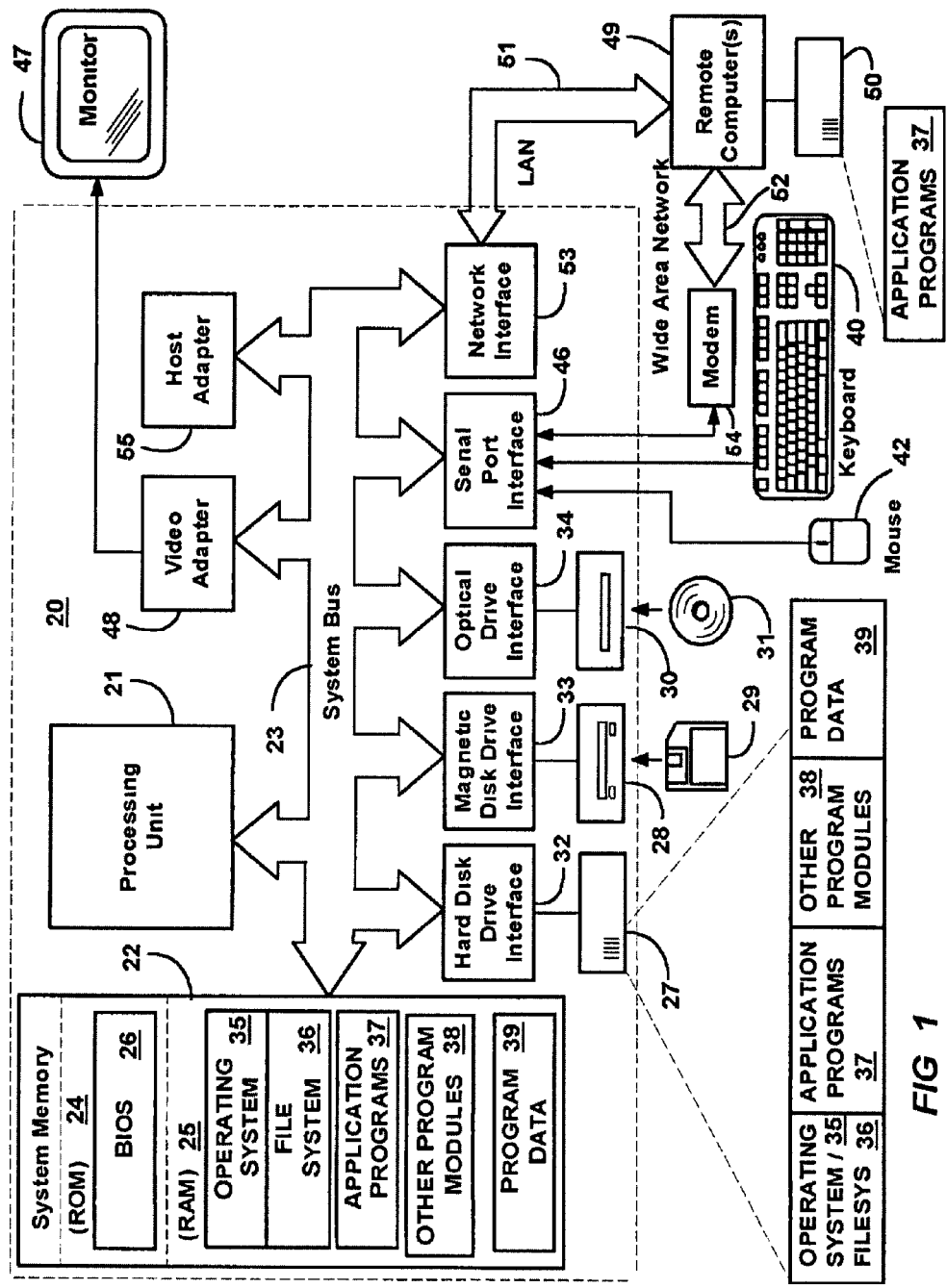
FIG. 1 is a block diagram representing an example computer system in accordance with one or more embodiments.

FIG. 1 and the following discussion are intended to provide a brief general description of an example computing environment in which one or more embodiments may be implemented. Although not required, one or more embodiments will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that one or more embodiments may be practiced with other computer system configurations, including handheld devices, multi-processor systems, microprocessor-based or programmable consumer electronics, network PCs, minicomputers, mainframe computers and the like. One or more embodiments may also be practiced in distributed computing environments where tasks are performed by remote processing devices that are linked through a communications network. In a distributed computing environment, program modules may be located in both local and remote memory storage devices.

With reference to FIG. 1, an example system for implementing one or more embodiments includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the example environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the example operating environment.

A number of program modules may be stored on the hard disk, magnetic disk 29, optical disk 31, ROM 24 or RAM 25, including an operating system 35 (for example, Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are examples only, and other means of establishing a communications link between the computers may be used.

DHTML Behaviors

DHTML behaviors (e.g., 60, FIG. 2) can be components that encapsulate specific functionality or behavior on a page, but are external to the page. DHTML behavior components can be COM objects, although behavior components may be implemented using script and HTML. The interfaces for DHTML behavior components are few, simple, and robust, as described below.

Figure 2:
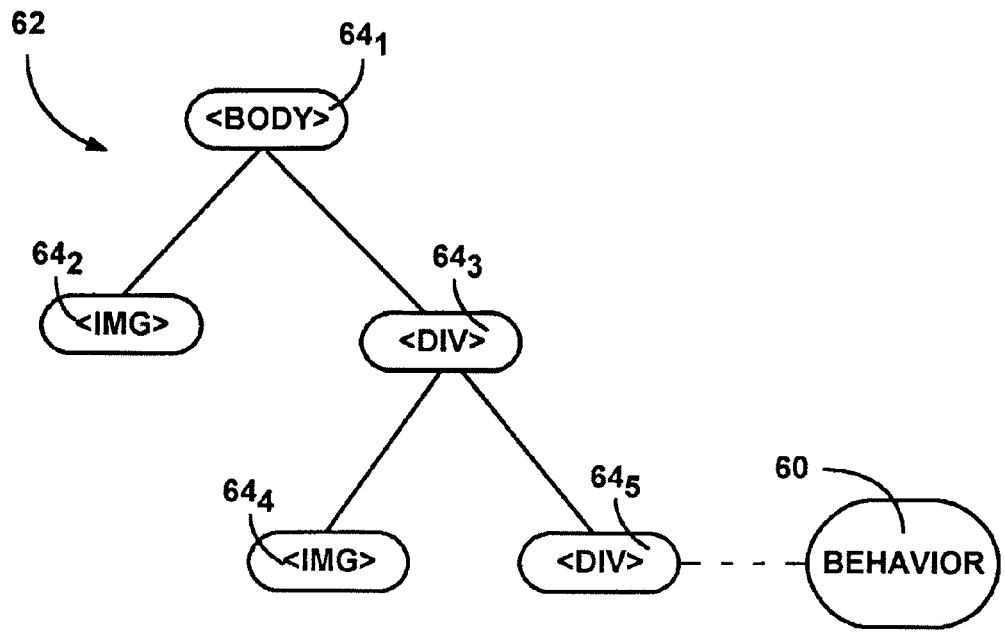
FIG. 2 illustrates a representation of a document tree representing elements hierarchically arranged on a web page and having a behavior attached to an element in accordance with one or more embodiments.

In general, an HTML document, or page, may be considered a document tree, in that elements are contained by other elements in a hierarchical manner. As shown in FIG. 2, an exemplary HTML document tree 62 shows elements $64_1$-$64_5$ as nodes of the tree, and a behavior 60 attached to one of the elements $64_5$. Indeed, a renderer (browser) 66 logically constructs such a tree when provided with a page, (e.g., $68_A$ of FIG. 3), whereby attributes and the like may be applied appropriately to elements as events are received, i.e., the events bubble up through the tree as described below.

When applied to a standard HTML element on a page, a behavior component 60 can enhance that element's default behavior. For example, a behavior component can be written to toggle the display property of an element's children on a mouse click. When such a behavior component 60 is applied to a standard element on a page, the behavior component 60 enhances the unordered list's default behavior to expand and collapse when clicked. Another behavior component (e.g., $60_1$ of FIG. 3) can incrementally set the position of an element from a start point to an end point on the screen, whereby if such a behavior component $60_1$ is applied to an image element, the otherwise statically positioned image "flies" across the screen.

Figure 3:
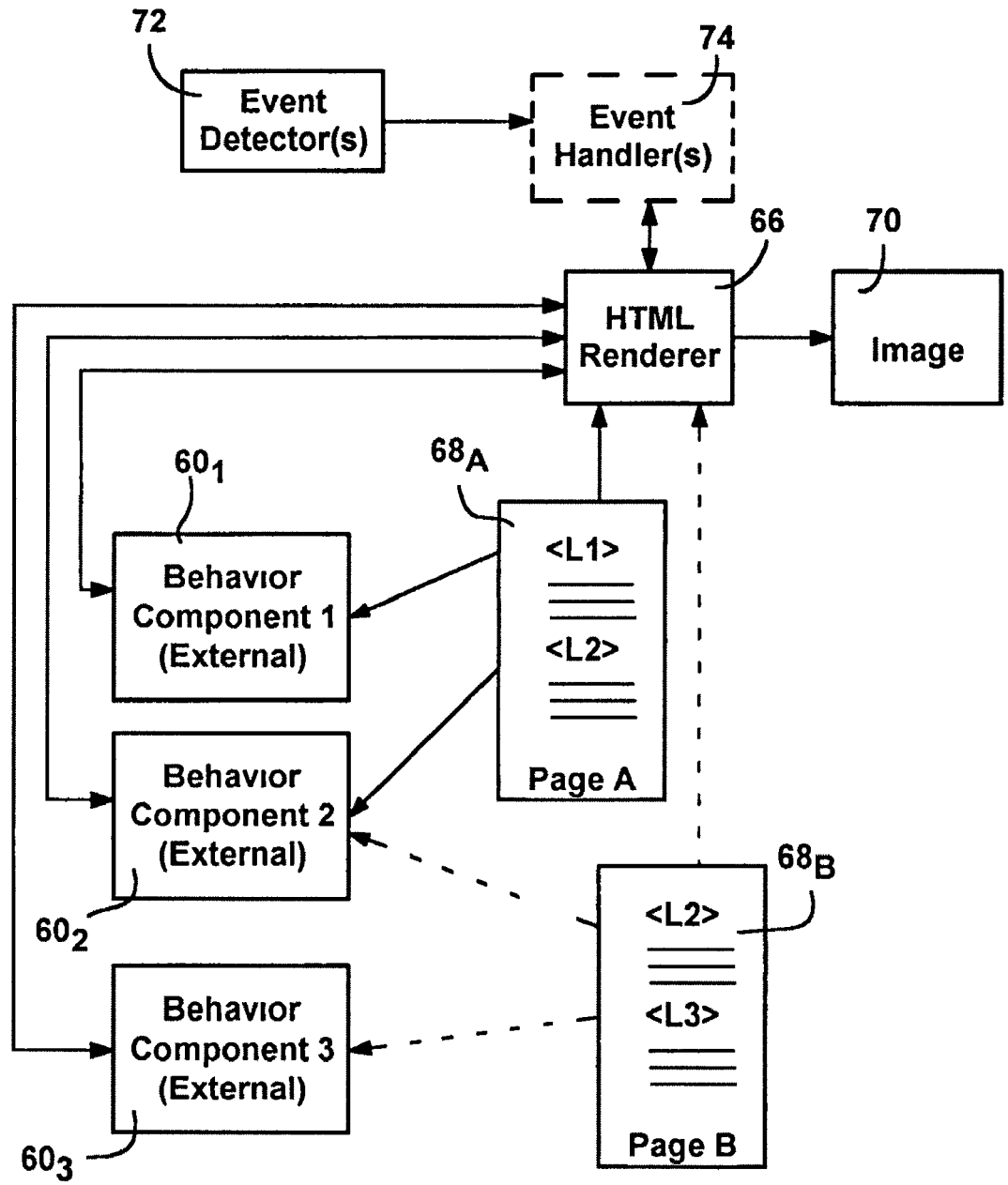
FIG. 3 is a block diagram representing a number of external behavior components and multiple pages that reference those components for use in rendering an image in accordance with one or more embodiments.

In accordance with one or more embodiments and as represented in FIG. 3, behavior components $60_1$-$60_3$ are external components with respect to the pages $68_A$, $68_B$, and thus separate script from content. As a result, improved manageability of pages $68_A$, $68_B$ is provided. Moreover, because the behavior components $60_1$-$60_3$ are encapsulated components, the code of a behavior component may be reused across multiple pages. For example, as represented in FIG. 2, the page $68_A$ includes elements that reference and (when parsed by an HTML renderer 66) use two external behavior components $60_1$ and $60_2$, while the page $68_B$ has elements that also use (another instance) of the behavior component $60_2$ along with the external behavior component 60₃. The renderer 66 outputs and/or modifies an outputted image based on the attached behaviors. One example of a renderer 66 which may be utilized according to one or more embodiments is Microsoft Corporation's Internet Explorer 5.0 rendering engine (mshtml.dll), which, in addition to being able to handle behavior components, provides data manipulation, formatting, and content changes without dependency on a Web server. With such an engine, enhanced programmatic access and control is provided, the location of objects and images can be precisely specified, and HTML tags, style sheets, text, tables, and ActiveX objects can be handled without requiring interaction with a Web server.

To use a behavior component (e.g., 60₁ of FIG. 3) in accordance with one or more embodiments, an engineer or the like can first develop the behavior component 60₁ using script or a language such as C++ to develop a binary file. More particularly, DHTML behavior components can be written in script using script component technology to provide a safe extensibility mechanism for those that are familiar with script and the Dynamic HTML Object Model. A utility or the like converts the script to a COM object. Behavior components created in C++ use an OBJECT tag syntax (described below) to instantiate, and may be directed to a specific platform, for example, to access Win32 Application Programming Interfaces (APIs) and the interfaces for implementing DHTML behavior components. Note that a number of default behaviors may be developed and, for example, provided with a browser, whether the browser is a stand-alone application or integrated with an operating system, e.g., Internet Explorer.

In accordance with one or more embodiments, once developed, a page designer or the like may then use the declarative HTML tag syntax that is already familiar to the designer in order to refer to the behavior component. To this end, the designer can include a behavior attribute, essentially a reference to the behavior component, such as in an embedded style in the cascading style sheet block, and also attaches a tag to each element that implements that behavior component. In other words, using existing cascading style sheet support in the renderer 66, a behavior can be added to an element.

The behavior property in cascading style sheets can have the following syntax:

Behavior:url (url pointing to behavior component)

This syntax can be used in any standard style declaration, for example, in an Inline style declaration on an element, as described below. For example, to add a fly (move across the screen) behavior to a DIV element, a designer enters:

<DIV style="behavior:url(fly.htc)"> some text here that will fly</DIV>

As also described below, a class can also be declared to apply to elements in the document. For example, a flyme class may be defined, and can be applied to a DIV element:

```
<STYLE>
  .flyme{behavior:url(fly.htc) }
</STYLE>
...
<DIV class= flyme > this text will fly </DIV>
```

A new, custom tag may also be defined with a behavior attached, as also described below, for example:

```
<HTML xmlns:fly >
...
<STYLE>
  fly\:flyme{behavior:url(fly.htc) }
</STYLE>
...
<fly:flyme> this text will fly </fly:flyme>
```

The renderer 66 handles the association between the tag and the behavior component, along with the instantiation of the behavior component and the interfacing thereto, whereby script is no longer needed on the page. The result is dynamic HTML via a substantially cleaner, script-free page.

Figure 4:
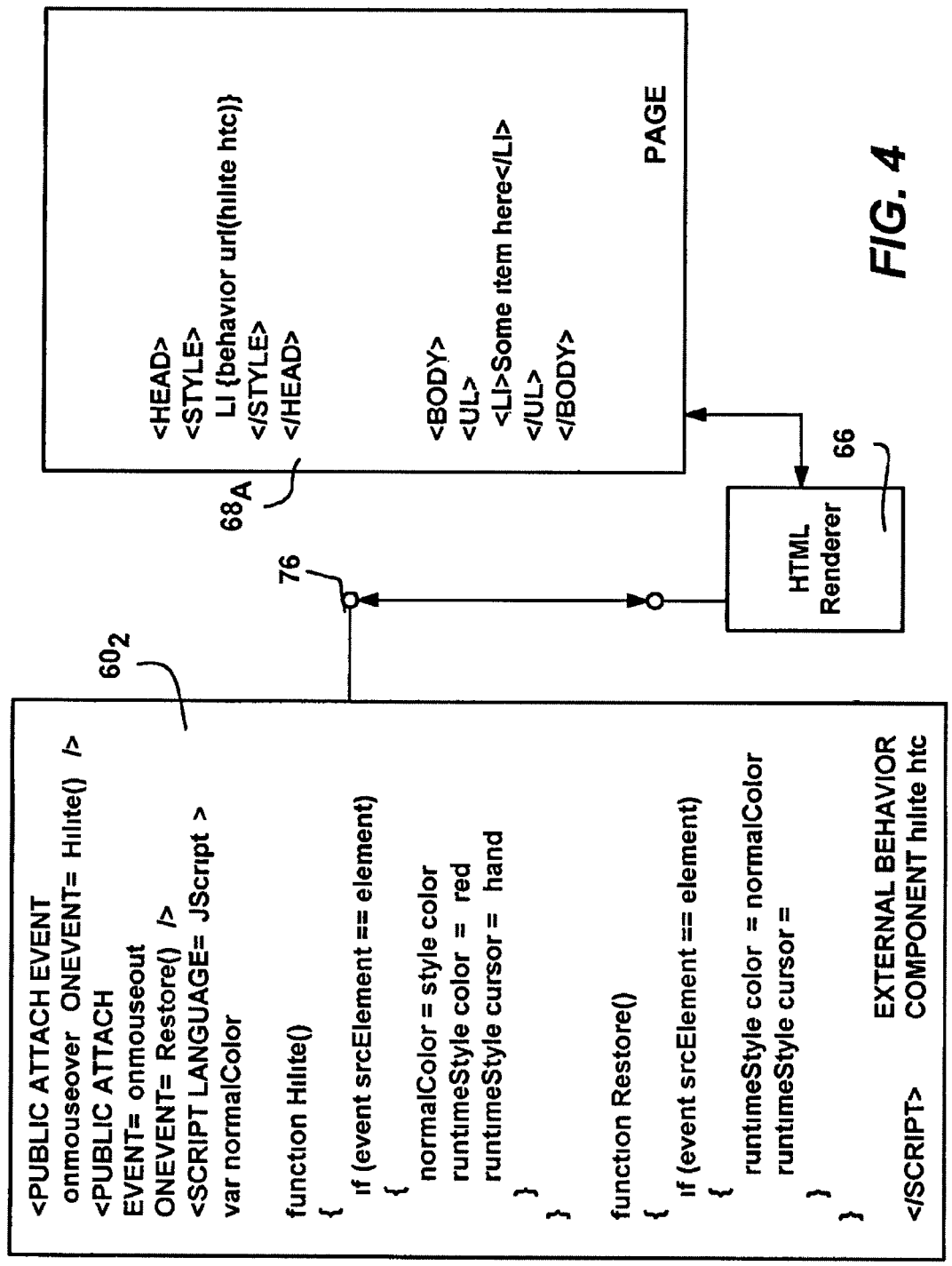
FIG. 4 is a block diagram representing the relationship between style sheets and elements on a page wherein at least one of the elements is associated with an external behavior component in accordance with one or more embodiments.

By way of example, as shown in FIG. 4, the behavior component 60₂ is maintained in a file called hilite.htc, (where HTC stands for HTML Component) and is referenced by the behavior tag <LI> in the cascading style sheet block of the page 68₄ (as indicated by the <Style> tags). This behavior component 60₂, shown for purposes of clarity in FIG. 4 as having human-readable script therein, affects the way text appears when the mouse is over that text, i.e., provides mouseover highlights. In other words, this behavior, when applied to an "LI" (list item) element in the body of the page 68₄, extends the list item's default behavior to change its color when the user moves the mouse over it, and then restore its original color when the mouse is moved off of the item.

The page entries are shown in the table below, followed by the behavior script (corresponding to FIG. 4):

Page:

```
<HEAD>
<STYLE>
    LI {behavior:url(hilite.htc)}
</STYLE>
</HEAD>
    :
<BODY>
<UL>
    <LI>Some item here</LI>
</UL>
</BODY>
```

Script in Behavior:

```
<PUBLIC:ATTACH EVENT "onmouseover"
ONEVENT="Hilite( )" />
<PUBLIC:ATTACH EVENT="onmouseout"
ONEVENT="Restore( )" />
<SCRIPT LANGUAGE="JScript">
var normalColor;
function Hilite( )
{
    if (event.srcElement == element)
    {
        normalColor = style.color;
        runtimeStyle.color = "red";
        runtimeStyle.cursor = "hand";
    }
}
function Restore( )
{
```

-continued

```
        if (event.srcElement == element)
        {
            runtimeStyle.color = normalColor;
            runtimeStyle.cursor = "";
        }
    }
</SCRIPT>
```

As can be readily appreciated, the behavior component $60_4$ used in FIG. 4 to implement the mouseover highlight effect was implemented as an HTC, and involves just a few lines of code. As shown above and in FIG. 4, the code mainly comprises script, with a number of elements used to define the behavior. Note that the use of the ATTACH element allows an HTC to listen in on events fired on the element on the page and to handle the events appropriately, as generally described below. This provides a means to encapsulate event-handling code that would otherwise be put on the page.

Although HTC provides a quick and easy way to create DHTML behaviors using scripting languages such as Microsoft® Visual Basic® Scripting Edition (VBScript) and Microsoft® JScript® (compatible with ECMA 262 language specification), like other components used on the Internet today, behaviors can be alternatively implemented using Windows® Scripting Components (WSC) or C++. Note that when using the behavior attribute, the type of behavior, i.e., a behavior implemented as a binary component (using C++ or any compiled code), a default behavior (built into the renderer 66), or as a component written in script (either as an HTML Component or as a scriptlet) determines the syntax used to apply the behavior to an element using cascading style sheets. In the case of a Component Script and HTML implementation, the STYLE can specify a URL for the script that implements the component. In the case of a binary implementation of the component, the url in the style can refer to the ID of an OBJECT tag that declares a binary component to supply a factory for the component.

When different instances of a behavior component are attached, a style subject of the element can be used, as set forth in the following example:

```
<HEAD>
    <SCRIPT>
    function window.onload( )
    {
        L1.style.behavior = "url(hilite.htc)";
        L2.style.behavior = "url(hilite.htc)";
    }
    </SCRIPT>
</HEAD>
<UL>
    <LI ID=L1>Some item such as text here</LI>
    <LI ID=L2>and some other item here</LI>
</UL>
```

Another way in which cascading style sheets may be used to implement a behavior on an element is by defining an embedded style, using a class name as a selector. Note that the selector begins with a period (.), which is the syntax for class names as selectors. This can cause each element assigned the class name of HILITE to behave as defined in hilite.htc. An example using a class name is shown below:

```
<HEAD>
    <STYLE>
        .HILITE { behavior:url(hilite.htc) }
    </STYLE>
</HEAD>
<UL>
    <LI CLASS="HILITE">Some item here</LI>
    <LI CLASS="HILITE">and another here</LI>
</UL>
```

As shown in FIG. 3, because the behavior is an instance of a separate file, the behavior component $60_2$ may be reused across multiple pages $68_A$, $68_B$ to achieve a similar effect throughout an entire web site. Moreover, note that instead of referencing the behavior in cascading style sheet block as in the preceding example, like other cascading style sheet attributes, the behavior may be applied as an inline style to the LI element, as shown in the following example:

```
<BODY>
<UL>
    <LI STYLE="behavior:url(hilite.htc)"> Some item here
</UL>
</BODY>
```

In general, the designer typically specifies the behavior attribute based on how many elements are to have the behavior applied. For example, defining the behavior inline or through script is appropriate for applying the behavior to a select number of elements, while defining an embedded style is appropriate for applying the behavior to a set of elements globally.

Another way in which a behavior may be applied to an element is via scripting, using the addBehavior method. The addBehavior method is a dynamic way of applying a behavior to an element. When the method is called, the behavior can be appended to a list of behaviors being applied to the element (as opposed to overwriting the behavior that might have already been attached to that element at the time the method was called). Once attached, the behavior can be detached anytime using the removeBehavior method. The following example demonstrates how a behavior that implements a mouseover highlighting effect could be dynamically attached to each of the LI elements on a page using addBehavior. Subsequently, the behavior may be detached using removeBehavior in a similar manner.

```
<SCRIPT LANGUAGE="Jscript">
var collBehaviorID = new Array( );
var collLI = new Array ( );
var countLI = 0;
function attachBehavior( )
{
    collLI = document.all.tags ("LI");
    countLI = collLI.length;
        for (i=0; i < countLI; I++)
        {
            var iID = collLI[i].addBehavior ("hilite.htc");
            // if behavior has already been added to the element,
            // addBehavior returns 0.
            if (iID)
                collBehaviorID[i] = iID
        }
}
</SCRIPT>
```

Note that a behavior attached to an element through cascading style sheets, using a style rule defined in the document, can be automatically detached from the element as soon as the element is removed from the document tree. Once the element is removed, all associations of that element to any element in the document tree, such as style sheet rules that specify behaviors, can be stripped from the element as well. Conversely, a behavior attached to an element through an inline style, or through the addBehavior method, is not automatically detached from the element when the element is removed from the document hierarchy. These two methods of applying behaviors have no dependencies on the containing document, and therefore the behavior remains applied to the element even as it is removed from the document tree. The removeBehavior method can be invoked to explicitly detach this type of behavior from the element.

Multiple behaviors can be applied to an element, for example by specifying a space-delimited list of URLs for the behavior attribute, as shown in the following code. This particular sample demonstrates how two behaviors can be applied to an element to achieve a combination of effects:

```
<UL>
   <LI STYLE="behavior:url(collapsing.htc)
url(hilite.htc)">HTML</LI>
      <UL>
         <LI> Some item here changes color and collapses</LI>
            :
      </UL>
</UL>
```

Note that the addBehavior method can also be called to apply additional behaviors to an element.

When applying multiple behaviors to an element, conflicts may occur. For example, multiple behaviors can operate to change an element's color. Conflicts are resolved based on the order in which the behavior was applied to the element. Using the above example, the "collapsing.htc" behavior is applied first, followed by the "hilite.htc" behavior, with each subsequent behavior taking precedence over the previous behavior. In the above example, if there are no conflicting style assignments between the two behaviors, any style changes made by both behaviors are applied unaltered to the element. If, however, both behaviors set the element's color, for example, the second (hilite.htc) behavior's color prevails because it was applied to the element later than the first behavior (collapse.htc). The same rule can apply when resolving name conflicts, such as with property, method, or event names exposed by multiple behaviors.

The behavior property of an element can be overridden when multiple styles are applied to an element, (similar, for example, to the overriding of the color property). When resolving style conflicts in an HTML document, the cascading style sheet rules of cascading and inheritance prevail, wherein the order of specificity, from greatest to least, is (1) inline styles; (2) ID; (3) CLASS; and (4) HTML element. In the following example, both the "Collapsing" class and the inline style for the LI element define the behavior attribute:

```
<STYLE>
   UL { font-family: verdana, arial, helvetica, sans-serif; font-size:10}
   Collapsing {behavior:url(collapsing.htc) }
</STYLE>
   :
<UL>
   <LI CLASS="Collapsing" STYLE="behavior:url(hilite.htc)">HTML
Authoring</LI>
   :
>
```

Applying the precedence rules to the example, the inline style that applies the highlighting behavior to the element prevails over the "Collapsing" class, so that only the highlighting effect gets applied to the LI, and the expanding/collapsing effect does not get applied. In this situation, the inline style takes precedence over the rule with CLASS as the selector.

As a component, a DHTML behavior may expose properties, methods, and events that define its object model. When a behavior is applied to an element, the element's properties, methods, and events are extended to include those exposed by the behavior.

In accordance with one or more embodiments and from the perspective of the renderer 66, the renderer 66 can operate in response to an event to interpret the appropriate page elements. In some embodiments, when an element in the HTML document having a behavior component attached is parsed by the renderer 66, instead of having to run a script, the renderer 66 can instantiate (or uses if already instantiated) the behavior component to perform some action. In some embodiments, instantiation of a behavior component may require downloading, and, if a download is required, the component may be downloaded and instantiated on a separate thread whereby the parsing of the main document is not halted.

As generally described below, when an event is received, (e.g., from some event detector 72, FIG. 3) the renderer 66 knows to which element the event applies, and takes appropriate action based on that event. Events fired by behaviors can be handled the same way as standard DHTML events, and are thus only generally described herein for purposes of simplicity. First, the user action or condition associated with the event occurs. An event object is updated to reflect the conditions of the event, and the event fires, i.e., a notification is provided in response to the event.

FIG. 5 generally represents the actions taken when an event notification is received. At step 500, the lowest element in the hierarchy is selected, and tested for whether it has an associated event handler for this particular event. As generally described above, the ATTACH element may be used to associate an event handler 74 (FIG. 3) to a specific event and specific element or object in order for the handler to be called when the event fires. Other ways of attaching event handlers to DHTML elements are well known to those skilled in the art and are not described herein.

If no event handler is attached, the event bubbles up through the hierarchy of elements until the top of the hierarchy has been reached, (i.e., until the event bubbles up to the window object), as represented by steps 516-518. If an event handler 74 is attached to the current element, such as to handle mouseover events, at step 504 the event handler 74 is called to carry out its actions and return. For example, as represented via steps 506-508, the event handler 74 may determine if a behavior component needs to be instantiated (step 508), and if so, instantiates the behavior (step 508). Then, the event handler 74 (or renderer) calls a method of that behavior (step 510)

on an interface 76, passing it any needed information (e.g., the rendered element's coordinates) to carry out its actions to affect the element's appearance or behavior, (e.g., to change the rendered element's color). Note that some or all of the event handler functions described herein may be performed by the renderer 66, e.g., instantiating the behavior as needed, and calling a method thereof, while other event handler operations may be written into the behavior component. A dashed box is used to represent the event handler 74 in FIG. 3 because its functionality can be thus performed by other components.

An event handler can cancel the bubbling of an event, as represented by step 512, wherein the event is considered fully handled. Otherwise the event handling process branches to step 516, where the event bubbles up through the hierarchical tree of elements via steps 516 and 518. A final default action (optional at step 520, shown as a dashed box) may be taken if the event not canceled by a handler at step 512.

Basic interfaces for calling an instantiated behavior component are set forth below, along with accompanying information:

| | |
|---|---|
| IElementBehavior | Receives notifications from MSHTML.dll concerning the activities of DHTML behaviors. |
| IElementBehaviorCategory | Provides DHTML behaviors a means of identifying their category. |
| IElementBehaviorFactory | Provides DHTML behavior implementations to the MSHTML component of Internet Explorer 5. |
| IElementBehaviorRender | Enables a behavior component to participate in the rendering of text and objects. |
| IelementBehaviorSiteCategory | Provides DHTML behaviors a means of identifying other related behaviors by category. |
| IElementBehaviorSite | Provides communication between MSHTML and a component. |
| IElementBehaviorSiteOM | Provides event services to behavior components. |

The IElementBehavior interface is an example of an event sink that receives notifications from Mshtml.dll concerning the activities of Dynamic HTML (DHTML) behaviors. This interface can be obtained from the IElementBehaviorFactory::FindBehavior method, described below.

IElementBehavior Methods:

| | |
|---|---|
| Detach | Called before the document unloads its contents. |
| Init | Called with the IElementBehaviorSite interface immediately after the IElementBehavior interface is obtained from the IelementBehaviorFactory::FindBehavior method. |
| Notify | Called with information about the parsing of the document and the behavior component. |

IElementBehavior is an example of the basic interface to be implemented by a DHTML Behavior component. Init( ) is called on the Behavior when it is instantiated, and is used to pass the IElementBehaviorSite to the Behavior component. The behavior component may cache this pointer for later use, and the pointer is passed to the behavior component without the interface addressed. Notify( ) is a generic mechanism to send down arbitrary notifications to the component. Notifications that are currently sent include BEHAVIOR-EVENT_CONTENTREADY, fired once when the content of the element has been initially parsed (not every time the content changes). The other notification is the BEHAVIOR-EVENT_DOCUMENTREADY notification, which is sent when the contents of the document have been parsed. According to some embodiments, this can be equivalent to the onload event or readystate which is fired when the entire document, including images, OBJECTS, SCRIPTS, and so forth have also been downloaded. The DOCUMENTREADY notification can be sent after the document has finished parsing.

The IElementBehaviorCategory interface can provide DHTML behaviors a means of identifying their category. Using identification by category, related behaviors may be easily located.

IElementBehaviorCategory Methods:

| | |
|---|---|
| GetCategory | Retrieves the category of this behavior as a string. |

The IElementBehaviorFactory interface can provide DHTML behavior implementations.

IElementBehaviorFactory Methods:

| | |
|---|---|
| FindBehavior | Instantiates the IElementBehavior interface. |

The IElementBehaviorRender Interface can enable a behavior component to participate in the rendering of text and objects. In some embodiments, if the behavior component does not need to participate in such rendering, this interface need not be implemented.

IElementBehaviorRender Methods:

| | |
|---|---|
| Draw | Called whenever MSHTML needs to render the component. |
| GetRenderInfo | Provides data to MSHTML for rendering the behavior component. |
| HitTestPoint | Retrieves if a specified point is hit by your application. |

The IElementBehaviorSiteCategory interface can provide DHTML behaviors a means of identifying other related behaviors by category. Using identification by category, related behaviors may be easily located.

IElementBehaviorSiteCategory Methods:

| | |
|---|---|
| GetRelatedBehaviors | Retrieves a list of all related behaviors that share the same category. |

The IElementBehaviorSite interface is an example means of communication that a component has with MSHTML.dll. This interface can be first received by the IElementBehavior:: Init notification. The IElementBehaviorSiteOM, IBindHost and IServiceProvider interfaces can be accessed through the IElementBehaviorSite interface by using QueryInterface.

IElementBehaviorSite Methods:

| | |
|---|---|
| GetElement | Retrieves the element to which a component is bound |

The IElementBehaviorSiteOM interface can be responsible for providing event services to behavior components. In accordance with one or more embodiments, to access this interface, use QueryInterface on the IElementBehaviorSite interface returned by the IElementBehavior::Init notification method.

IElementBehaviorSiteOM Methods:

| | |
|---|---|
| CreateEventObject | Instantiates a new event object for use in firing an event. |
| FireEvent | Fires a behavior component event. |
| GetEventCookie | Retrieves the behavior-ID (handle) that identifies the component to MSHTML.dll. |
| RegisterEvent | Registers a behavior event with MSHTML.dll. |
| RegisterName | Registers a behavior event with MSHTML.dll. |
| RegisterUrn | Registers a behavior event with MSHTML.dll. |

In accordance with one or more embodiments, behaviors can extend an existing HTML element by adding functionality via an Object Model. An example is the mask edit behavior, wherein behavior is applied to input elements that allow data entry. The mask behavior can provide a combination of restricted input and formatted output. For example, a mask behavior component can be applied through one of several preset formats to many common types of forms fields, such as date, time, and phone number fields, whereby the user may only enter appropriate data (e.g., numbers) in appropriate fields. To this end, when information is entered, the behavior may provide visual cues about the type of acceptable information (e.g., a slash "/" between numeric mm/dd/yy date entries) and/or feedback about incorrect entries. A sample htc (HTML Component) file that provides entry fields for date, money and time entries via mask behavior is set forth below:

```
<property name=maskType />
<script language="jscript">
var realValue;
var formattedValue;
doBlur( );
attachEvent("onfocus", doFocus);
attachEvent("onblur", doBlur);
function doFocus( ) {
   value=realValue;
}
function formatMoney(aValue) {
   var theFloat = parseFloat(aValue);
   var theMoney = (Math.round(theFloat * 100)) / 100;
   var theMoneyString = "$"+theMoney;
   return theMoneyString;
}
function formatDate(aValue) {
   var theMS = Date.parse(aValue);
   var theDate = new Date(theMS);
   return theDate.toLocaleString( ).slice(0,10);
}
function formatTime(aValue) {
   var theMS = Date.parse("1/1/80 "+aValue);
   var theDate = new Date(theMS);
   return theDate.toLocaleString( ).slice(10,23);
}
function format(aValue) {
   if(aValue == "") {
      return "";
   }
   if (maskType == "money") {
      return formatMoney(aValue);
   }
   if(maskType == "date") {
      return formatDate(aValue);
   }
   if (maskType == "time") {
      return formatTime(aValue);
   }
}
```

-continued

```
}
function doBlur( ) {
   realValue = value;
   value=format(value);
}
</script>
```

In some embodiments, new tags may be used for applying behaviors to elements instead of existing tags. For example, a CIRCLE or SQUARE tag may be used for vector graphics. New tags are parsed and the document tree built as though it were a standard container tag with clearly defined parsing rules for a containing tag.

To this end, behavior components can define functionality for new tags that follow an XML namespace syntax, and thus new tags can be declared using a declaration on the HTML tag, for example:

<HTML xmlns:vg="http://www.mvsite.com/vg">

According to some embodiments, this can declare the XML namespace of VG for use within the document. The style sheet to declare behaviors and styles for the custom tags can use a linked style sheet, but the form is as follows:

```
<STYLE>
@media all {
VG\:CIRCLE{ behavior:url(http://mysite/mytag.circle.htc);}
VG\:SQUARE{ behavior:url(http://mysite/mytag.square.htc);}
}
</STYLE>
```

The tags would be used in the document as follows:

```
<VG:CIRCLE width=100 height=100 center=150>
<VG:SQUARE width=50 height=50>
some text in the <B>square</B> that can be rendered by the renderer
or the Tag
</VG:SQUARE>
</VG:CIRCLE>
```

According to some embodiments, the new tags that follow XML syntax can have virtually any HTML within them. If any ill-formed, overlapping, or implied HTML tags are present, the renderer 66 can build the document tree to the best of its ability and render the page image accordingly. Note that use of @media all to contain the custom tag declarations is optional, which allows a downlevel browser to ignore the content, (as some browsers dislike the use of the backslash within cascading style sheets, although permitted).

According to some embodiments, behaviors may be used to render complex drawings. As described above, an extensible tag can use the renderer 66 to handle rendering of its data simply by placing the relevant content in the document tree, whereby the renderer 66's rendering abilities do the rest.

To allow an extensible tag component to extend the browser's abilities, a new drawing interface can be established which the behavior component implements and the renderer 66 calls at appropriate times during its rendering. When called, the drawing behavior component can be passed a drawing surface that is windowless, such that any drawing can fit into a specified z-index and be subject to any filter and transition effects.

The renderer 66 can draw in four passes, namely, 1) Background, the background of the document; 2) Negative-Z, any Z-index layers below the current element of interest; 3) Content—the content of the current element; and 4) Positive-Z, any Z-Index layers that are above the element.

Figure 6:
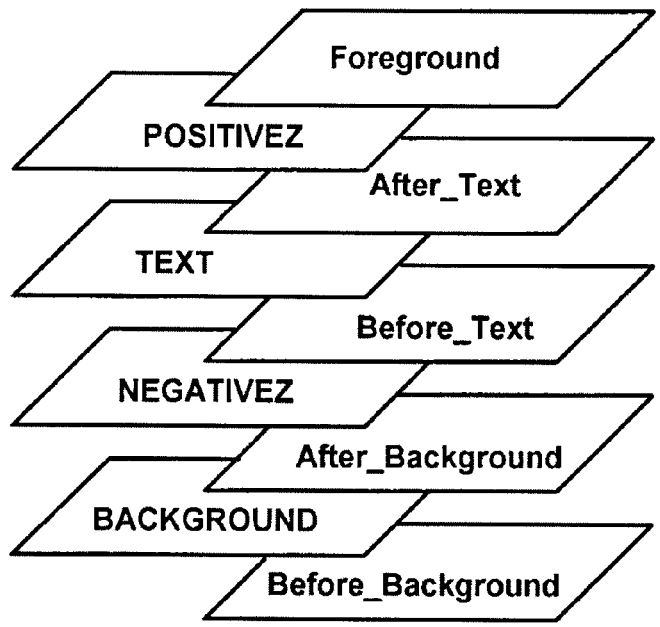
FIG. 6 is a representation of how an external behavior component may interleave complex drawings with the drawing of a renderer in accordance with one or more embodiments.

The extensible tag behavior component may prevent the renderer 66 from drawing any of the above four rendering layers, and also may provide drawing at any five additional layers that interleave renderer's layers. As represented in FIG. 6, these five layers are 1) Before Background, before the renderer 66 even draws the background of the document; 2) After Background, between the renderer's Background and Negative-Z layers; 3) Before Content, between the renderer's Negative-Z and Content layers; 4) After Content, between the renderers Content and Positive-Z layers; and 5) After Foreground, after the renderer's Positive-Z layer. The interface is set forth below:

IHTMLElementPeerRender:

```
Interface IHTMLElementPeerRender
{
   HRESULT Draw(DWORD dwLayer, HDC hdc, IpropertyBag2 *pPB2);
   HRESULT GetRenderInfo(RENDERINFO *prenderinfo);
};
Struct RENDERINFO
{
   DWORD cbSize;
   DWORD dwLayerMask;
   DWORD dwDrawMask;
};
#define DRAWLAYER_BEFORE_BACKGROUND   0x001
#define DRAWLAYER_BACKGROUND          0x002
#define DRAWLAYER_AFTER_BACKGROUND    0x004
#define DRAWLAYER_NEGATIVEZ
```

This interface can be implemented by any component which wants to participate in the rendering of text and objects.

As can be seen from the foregoing detailed description and in accordance with one or more embodiments, there is provided a method and system wherein dynamic functionality is encapsulated in a tag or class, and the behavior component is external to the page, providing clean, robust, powerful and extensible dynamic functionality to web page elements that may be reused across multiple pages. A simple declarative syntax greatly simplifies applying a behavior to an element.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A computer-implemented method for rendering a web page image, the method comprising:
receiving by one or more processors a Hypertext Markup Language (HTML) document having an element thereon, the HTML document including information associating the element with an external component that is encapsulated and external to the HTML document, the information comprising a reference to an extensible markup language (XML) namespace maintained in a cascading style sheet, the XML namespace declaring at least one behavior that can be imparted on elements in HTML documents, wherein a script for the at least one behavior is maintained in the external component separate from the HTML document, and wherein each of the at least one behavior includes an interface to the script maintained in the external component that can be called from the HTML document;
rendering by the one or more processors a page image corresponding to at least part of the HTML document, the page image including a representation of the element;
calling an interface of the external component to execute the script within the external component to impart one of the at least one behavior on the element rendered on the page image to enhance the element;
attaching the behavior to the element; and
wherein the behavior is attached to the element through the cascading style sheet, using a style rule defined in the HTML document.

2. The computer-implemented method of claim 1, wherein the external component is identified by a URL in the cascading style sheet.

3. The computer-implemented method of claim 2, wherein the cascading style sheet includes a tag that references the URL.

4. The computer-implemented method of claim 1, wherein the HTML document has a second element thereon, and the HTML document further includes information associating the second element with the external component.

5. The computer-implemented method of claim 1, wherein the method is performed by a web browser executing on the one or more processors.

6. The computer-implemented method of claim 1, further comprising reusing the external component to impart a behavior to another element on another HTML document.

7. A system for rendering a document having an element, the system comprising:
at least one memory device storing processor-readable data, the processor-readable data including at least a Hypertext Markup Language (HTML) document having an element defined thereon, a first external behavior component external to the HTML document, the first external behavior component encapsulating script to carry out a first behavior,
wherein a script for the first behavior is maintained in the first external behavior component separate from the HTML document, and wherein a cascading style sheet includes an extensible markup language (XML) namespace declaring the first behavior with reference to the first external behavior component;
a processor coupled to the at least one memory device and configured to read data from the at least one memory device to implement an HTML renderer configured to read the HTML document from the at least one memory device and render an image of the HTML document, the image including a representation of the element, the HTML renderer further configured to impart the first behavior to the element by calling an interface to the script encapsulated in the first external behavior component,
wherein the first behavior is attachable to the element; and
wherein the first behavior is attached to the element through the cascading style sheet, using a style rule defined in the HTML document.

8. The system of claim 7, wherein the first external behavior component is reusable to impart the first behavior to one or more other elements included in one or more other HTML documents.

9. The system of claim 7, wherein the processor-readable data further includes a second external behavior component external to the HTML document and including a script to carry out a second behavior, the XML namespace further declaring the second behavior with reference to the second external behavior component, the HTML renderer being further operable to impart a combination of the first and second behaviors to the element by calling interfaces of code encapsulated in the first and second external behavior components.

* * * * *